(12) United States Patent
Huang et al.

(10) Patent No.: US 8,773,384 B2
(45) Date of Patent: Jul. 8, 2014

(54) TOUCH PANEL AND METHOD OF FABRICATING THE SAME, AND TOUCH-SENSING DISPLAY DEVICE

(75) Inventors: Chun-Ming Huang, Taichung (TW); Jeng-Jye Hung, Taichung (TW); Hen-Ta Kang, Taichung (TW); Kuo-Chang Su, Tainan (TW); Chih-Jung Teng, Taichung (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 144 days.

(21) Appl. No.: 13/571,364

(22) Filed: Aug. 10, 2012

(65) Prior Publication Data

US 2013/0038553 A1     Feb. 14, 2013

(30) Foreign Application Priority Data

Aug. 12, 2011   (TW) .............................. 100128931 A

(51) Int. Cl.
*G09G 5/00*           (2006.01)
(52) U.S. Cl.
USPC .......................................... 345/173; 349/12
(58) Field of Classification Search
CPC ... G02F 1/1333; G02F 1/13338; G06F 3/041; G06F 3/0412; G06F 2203/04103
USPC .................. 345/173; 349/12; 156/60, 82, 242
See application file for complete search history.

(56) References Cited

U.S. PATENT DOCUMENTS

| | | | |
|---|---|---|---|
| 2010/0066650 A1* | 3/2010 | Lee et al. .......................... | 345/64 |
| 2010/0164881 A1* | 7/2010 | Kuo et al. ...................... | 345/173 |
| 2010/0328228 A1* | 12/2010 | Elias .............................. | 345/173 |
| 2011/0012839 A1* | 1/2011 | Lin ................................. | 345/173 |
| 2011/0012845 A1* | 1/2011 | Rothkopf et al. .............. | 345/173 |
| 2011/0102346 A1* | 5/2011 | Orsley et al. ................... | 345/173 |
| 2011/0242028 A1* | 10/2011 | Lee et al. ....................... | 345/173 |
| 2012/0111491 A1* | 5/2012 | Huang et al. ................... | 156/247 |
| 2012/0313884 A1* | 12/2012 | Huang et al. ................... | 345/174 |

FOREIGN PATENT DOCUMENTS

TW         201213948         4/2012

* cited by examiner

*Primary Examiner* — Tom Sheng
(74) *Attorney, Agent, or Firm* — Jianq Chyun IP Office

(57) ABSTRACT

A touch panel and a method of fabricating the same and touch-sensing display device are provided. The touch panel includes a cover plate, a touch sensing element, and an atomic layer-deposited (ALD) film. The cover plate has a top surface, a bottom surface, and a side surface. The top surface opposites to the bottom surface and the side surface connects the upper surface with the bottom surface. The touch sensing element is disposed on the bottom surface of the cover plate. The ALD layer completely covers the touch sensing element and completely covers the top surface, the side surface, and a portion of the bottom surface uncovered by the touch sensing element.

13 Claims, 9 Drawing Sheets

TOUCH PANEL AND METHOD OF FABRICATING THE SAME, AND TOUCH-SENSING DISPLAY DEVICE

CROSS-REFERENCE TO RELATED APPLICATION

This application claims the priority benefit of Taiwan application serial no. 100128931, filed on Aug. 12, 2011. The entirety of the above-mentioned patent application is hereby incorporated by reference herein and made a part of this specification.

BACKGROUND

1. Field of the Invention

The present invention relates to a touch panel and a method of fabricating the same, and a touch-sensing display device, and more particularly to a touch panel having favorable mechanical strength and a method of fabricating the same.

2. Description of Related Art

To reduce the size of an overall apparatus, a touch panel fabricated by disposing a touch-sensing element on the cover plate has been proposed. With a touch panel being formed with this technique, the touch sensing operation is performed by having the user to directly touch the touch panel. Therefore, it is highly probable that the touch panel becomes damaged because of its inadequate mechanical strength. Hence, the mechanical strength of a touch panel is a major factor affecting the durability of an electronic product.

Currently, a strengthened cover plate (for example, a tempered glass) is used for the fabrication of a touch panel to improve its mechanical strength. However, during the fabrication of a touch panel, a stress-concentrated area or an inappropriate fissure is generated on the strengthened cover plate. Accordingly, the improvement of mechanical strength with this type of technique is thereby limited. Moreover, the cover plate is subjected to cutting and mechanical polishing to provide the required dimension, and these processes may further create cracks at the side surfaces of the cover plate, which could then pose an adverse effect on the mechanical strength of the touch panel.

SUMMARY OF THE DISCLOSURE

An exemplary embodiment of the disclosure provides a touch panel with desired mechanical strength.

An exemplary embodiment of the disclosure provides a method for fabricating a touch panel having a touch-sensing element with desired mechanical strength.

An exemplary embodiment of the disclosure provides a touch-sensing display device with desired mechanical strength.

According to an exemplary embodiment of the disclosure, a touch panel includes a cover plate, a touch-sensing element, and an atomic layer-deposited (ALD) thin film. The cover plate includes a top surface, a bottom surface, a side surface, wherein the top surface and the bottom surface are opposite to each other, and the side surface connects the top surface with the bottom surface. The touch-sensing element is disposed on the bottom surface of the cover plate. The atomic layer-deposited thin film completely covers the touch-sensing element and covers entirely the top surface, the side surface, and a portion of the bottom surface of the cover plate, wherein the touch-sensing element is not disposed on the portion of the bottom surface.

According to an exemplary embodiment of the disclosure, a method for fabricating a touch panel includes providing a cover plate that includes a top surface, a bottom surface, and a side surface, wherein the top surface is configured opposite to the bottom surface, and the side surface connects with the top surface and the bottom surface. Further, the bottom surface of the cover plate is configured with a touch-sensing element. The method also includes performing an atomic layer deposition process to form an atomic layer-deposited thin film to cover the touch-sensing element and the top surface, side surface, and a portion of bottom surface of the cover plate, wherein the portion of the bottom surface is not disposed with the touch-sensing element.

An exemplary of the disclosure provides a touch-sensing display device that includes a display panel and a cover plate attached to the display panel. The cover plate includes a top surface, a bottom surface, and a side surface, wherein the top surface is disposed opposite to the bottom surface, and the side surface connects with the top surface and the bottom surface; a touch-sensing element disposed on the bottom surface of the cover plate; and an atomic layer-deposited thin film completely covering the touch-sensing element and the top surface, the side surface, and a portion of the bottom surface of the cover plate, wherein the portion of the bottom surface is not disposed with the touch-sensing element.

According to the exemplary embodiments of the disclosure, the surface of the touch-sensing panel is formed with a complete atomic layer-deposited thin film to cover any possible crack that may appear on the cover plate of the touch panel. The radius of curvature of the crack tip is increased and stress concentration is thereby alleviated. According to an exemplary of the disclosure, a packing thin film may be formed on the side surface of the cover plate of the touch panel to fill the crack on the side surface to further mitigate the stress concentration phenomenon. Ultimately, the mechanical strength of the touch panel is increased. Moreover, according to the exemplary embodiment of the disclosure, prior to the formation of an atomic layer-deposited thin film on the touch panel, an edge etching is performed on the side surface of the cover plate to smooth out the depth discrepancy of the crack in order to lower the stress concentration at the crack.

Reference now is made to the accompanying drawings to describe the exemplary embodiments of the disclosure.

DESCRIPTION OF EMBODIMENTS

Figure 1:
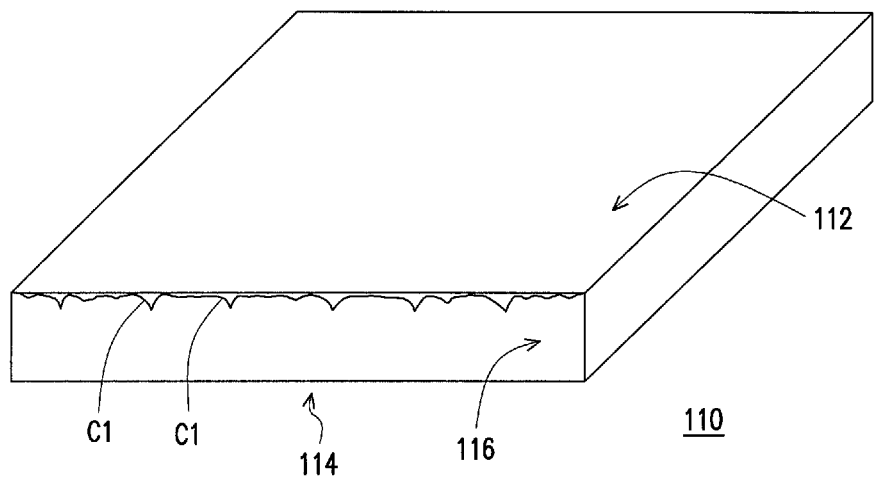
FIGS. 1 to 3 are schematic drawings respectively illustrate a touch panel in selected process steps of the fabrication thereof in accordance with an exemplary embodiment of the disclosure.

Referring to FIG. 1, a cover plate 110 is provided, and the cover plate 110 includes a top surface 112, a bottom surface 114, and a side surface 116, wherein the top surface 112 is configured opposite to the bottom surface 114, and the side surface 116 connects with the top surface 112 and the bottom surface 114.

In the exemplary embodiment of the disclosure, the cover plate 110 is formed with, for example, a polycarbonate or glass type of transparent and supportive material. Generally speaking, to provide the ultimate dimension, the cover plate 110 is resulted from the cutting and the polishing of a larger dimension mother plate. The stress generated from the cutting and polishing processes typically causes a crack C1 having a non-uniform depth developed at the side surface 116 of the cover plate 110. Moreover, during the fabrication process of a touch-sensing element, other fabrication process steps may cause a formation of a crack C1 at other locations of the cover plate 110.

Since the position of the crack C1 is typically the location of stress concentration, the presence of a crack is adverse to the mechanical strength of the cover plate 110. Moreover, the deeper the crack C1, the more deficient of the mechanical strength of the cover plate 110 is. Accordingly, in an exemplary embodiment of the disclosure, an edge etching is performed on the side surface 116 of the cover plate 110.

Figure 2:
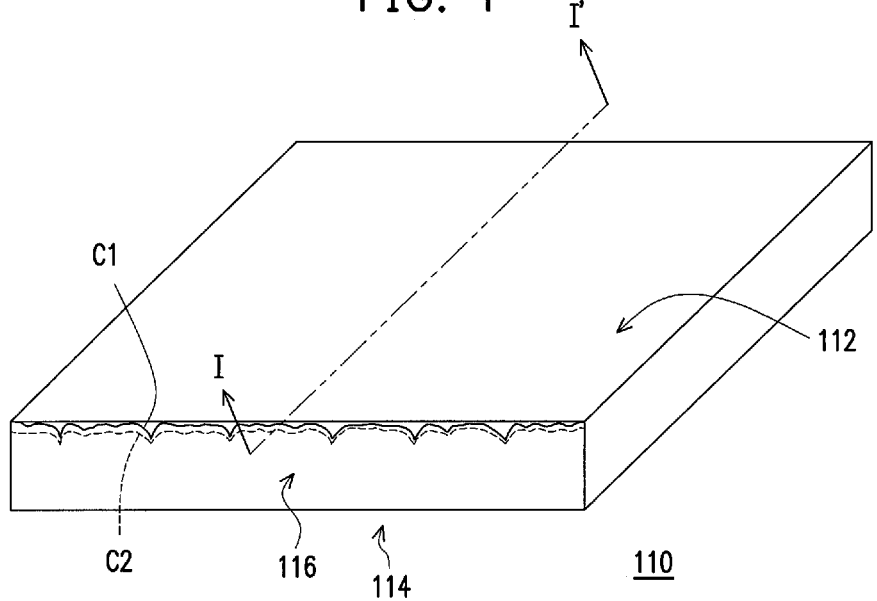

The edge etching process in an exemplary embodiment of the disclosure may include a chemical etching process. Subsequent to the edge etching process, a portion of the surface of the cover plate 110 is removed. Further due to the characteristics of chemical etching, the depth of the cover plate 110 being etched (i.e. the etching depth of the cover plate 110) is related to the time duration of the cover plate 110 being in contact with the etchant. The originally existing crack C1, after the cover plate 110 being in contact with the etchant, is covered with chemical byproducts and the cover plate 110 at the originally existing crack C1 is no longer in contact with the etchant. Ultimately, the etching depth of the cover plate 110 at the originally existing crack C1 is relatively reduced, and a cover plate 110 as shown in FIG. 2 is formed. Referring to FIG. 2, the crack C1 on the side surface 116 of the cover plate 110 is transformed to crack C2 after the side etching process, wherein the depth of the crack C2 is relatively smaller than that of the crack C1. Comparing crack C2 and crack C1, the generation of stress concentration is less significant. Therefore, damage to the cover plate 110 due to an external force is also prevented. Alternatively speaking, the relative reduction of the depth of the crack C2 is beneficial to the increase of the mechanical strength of the cover plate 110.

Figure 3:
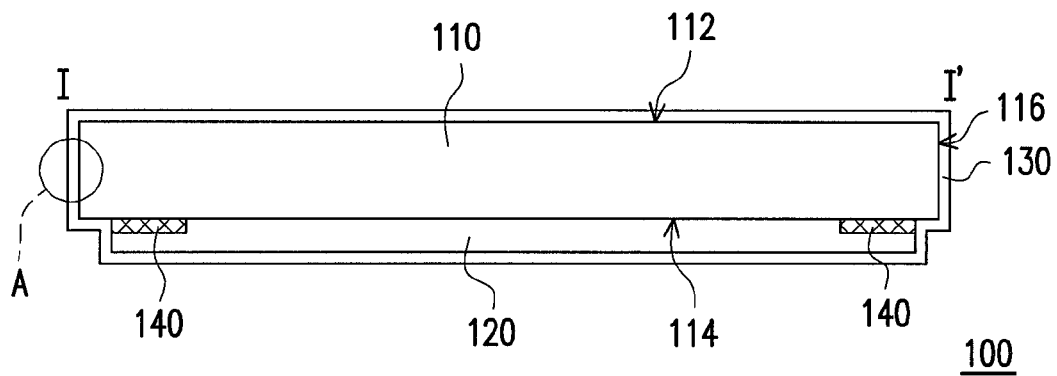

Referring to FIG. 3, the bottom surface 114 of the cover plate 110 is disposed with a touch-sensing element 120. The touch panel 100 includes a decorative layer 140 disposed on the bottom surface 114 of the cover plate 110 and encircling the peripheral of the touch-sensing element 120. The decorative layer 140 is constituted with a material that includes, but not limited to, carbon-like diamond, ceramic, ink, or a photoresist material.

Subsequent to the previously mentioned edge etching process, an atomic layer deposition process is performed to form an atomic layer-deposited thin film 130. The cover plate 110, the touch-sensing element 120, the decorative layer 140, and the atomic layer-deposited thin film 130 are assembled to form the touch panel 100. The atomic layer-deposited thin film 130 covers the touch panel 100. More specified, the atomic layer-deposited thin film 130 completely covers the touch-sensing element 120 and completely covers the top surface 112, the side surface 116 and a portion of the bottom surface 114 of the cover plate 110, wherein the touch-sensing element 120 is not disposed on the portion of the bottom surface 114.

In one exemplary embodiment, the atomic layer-deposited thin film 130 is formed with, for example, an inorganic material, an organic material, a polycrystalline material, or an amorphous material. The inorganic material may include, but not limited to, aluminum oxide, silicon oxide, titanium oxide, zinc oxide; while the organic material includes, for example, polyimide. The atomic layer-deposited thin film 130 is a highly dense material and provides favorable thin-film coverage characteristics. Accordingly, the exterior surface of the entire touch panel 100 is covered by this continuous and complete atomic layer-deposited thin film 130 to enhance the mechanical strength of the touch panel 100.

Figure 4:
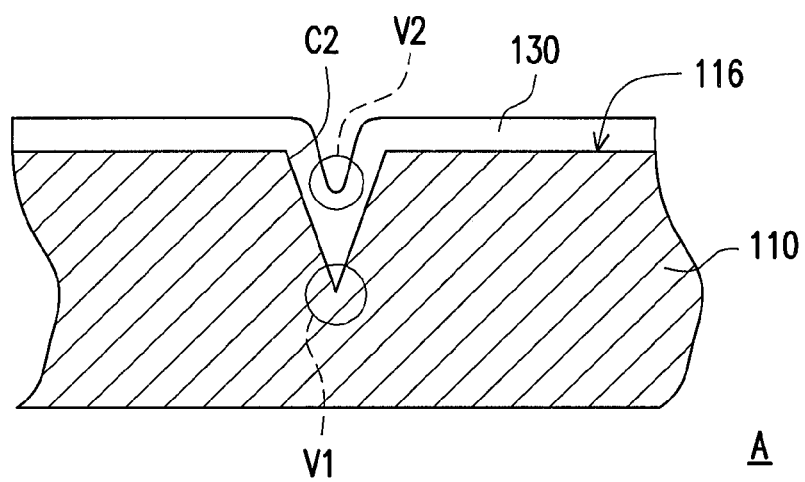
FIG. 4 is a partial enlarged view of region A in FIG. 1.

Referring to FIG. 4, although the crack C2 does not cause damage to the cover plate 110, stress is easily concentrated at the tip end V1 when the touch panel 100 is subjected to an external impact. According the Griffith fracture theory, when the touch panel 100 is subjected to a stress greater than a threshold value, the crack C2 is going to expand, which may induce damage to the touch panel 100. In other words, the stress accumulated at the tip end V1 may induce damage to the touch panel 100. Further, the radius of curvature of the tip end V1 influences the effect of stress concentration. When the tip end V1 is sharper, its radius of curvature is smaller and the effect of stress concentration is more pronounced. Hence, when the tip end V1 is sharper, the effect of stress concentration is more significant to pose an adverse impact on the reliability of the touch panel 100.

In an exemplary embodiment, the atomic layer-deposited thin film 130 is formed by an atomic layer deposition process. The atomic layer-deposited thin film 130 covers the surface of the crack C2 and form a smoother tip end V2. Comparatively, the radius of curvature of the tip end V2 is larger than the radius of curvature of the tip end V1. Accordingly, the effect of stress concentration resulted from the tip end V2 is less significant. The disposition of the atomic layer-deposited thin film mitigates the effect of stress concentration.

When under the same external impact, the crack C2, on which an atomic layer-deposited thin film is deposited, is less likely to expand. Hence, according to the exemplary embodiment of the disclosure, when an external surface of the touch panel 100 is formed with a complete and continuous atomic layer-deposited thin film 130, the probability of the touch panel 100 being damaged is lower. Additionally, the atomic layer-deposited thin film 130 fabricated by the atomic layer deposition process is very dense, which further improves the mechanical strength of the touch panel 100.

In other exemplary embodiment, since the disposition of the atomic layer-deposited thin film 130 enhances the mechanical strength of the touch panel 110, the edge etching process, as illustrated in FIG. 2, may be omitted.

Figure 5:
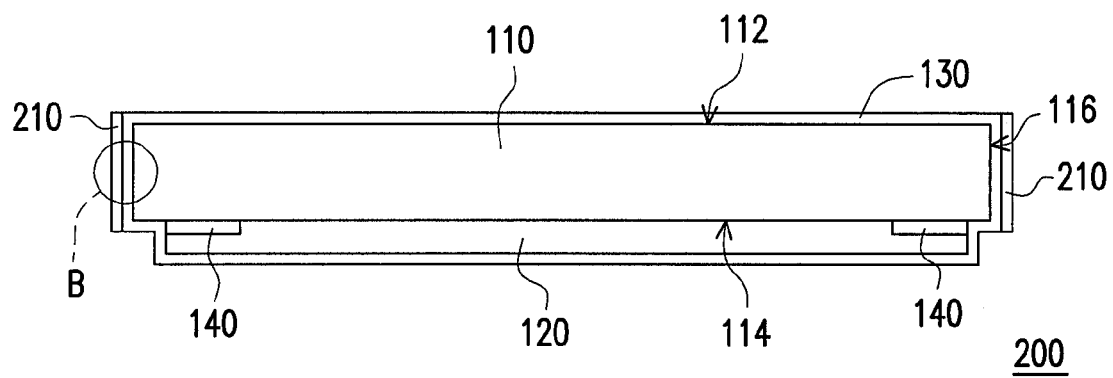
FIG. 5 is a schematic, cross-sectional view diagram of a touch panel according to another exemplary embodiment of the disclosure.

Referring to FIG. 5, the touch panel 200 and the touch panel 100 are substantially the same, and the same reference numbers are used to refer to the same or like parts. The touch panel 200 differs from the touch panel 100 mainly on the touch panel 200 further including a packing film 210 disposed on the side surface 116 of the cover plate 110. Additionally, a portion of the atomic layer-deposited thin film 130 is packed in between the packing film 210 and the side surface 116.

In an exemplary embodiment, the fabrication of the packing film 210 is accomplished by a sol-gel method, and the material of the packing film 210 may include an inorganic layer of silicon dioxide, for example. In an exemplary fabrication method, a hydrolysis and condensation reaction performed by adding water to tetraethoxy silane (TEOS) to generate a silicon dioxide sol. Thereafter, the sol is coated on the edge (the side surface of the cover plate 110) of the touch panel 200. The sol is solidified through heating to form the packing film 210.

Figure 6:
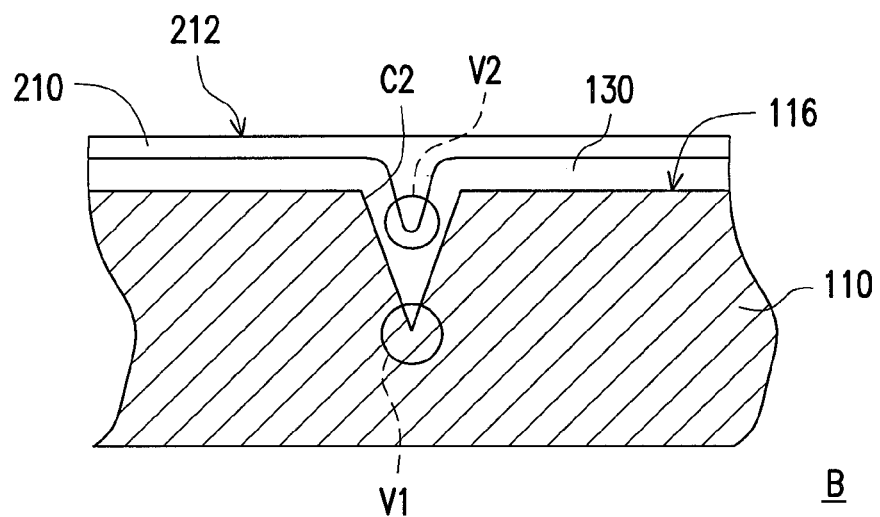
FIG. 6 is a partial enlarged view of region B in FIG. 5.

In an exemplary embodiment as shown in FIGS. 5 and 6, the sol is a fluid, which is capable of filling pits and cavities. Hence, the side of the packing film 210 far away from the atomic layer-deposited thin film 130 forms a planar surface 212. The tip end V2 formed in the atomic layer-deposited thin film 130 is filled to provide the touch panel 200 with a substantially smooth exterior surface. Accordingly, when the touch panel is subjected to an external impact, the phenomenon of stress concentration is less significant and the mechanical strength of touch panel is desired.

In the above touch panels 100 and 200, the touch-sensing element 120 may have various types of design, and the touch panels 100 and 200 may be installed in, for example, a liquid crystal display panel, an electrowetting display panel, an electrophoretic display panel, e-paper, or an organic light emitting display panel, to construct a touch-sensing display apparatus.

Reference will now be made to the various exemplary embodiments of the invention. It is to be understood that the touch-sensing elements 120 in these exemplary embodiments are presented by way of example and not by way of limitation.

Figure 7:
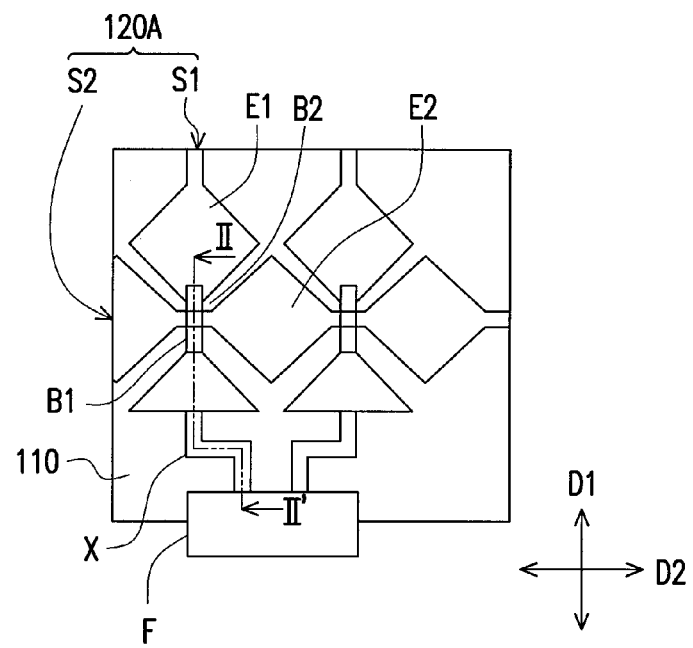
FIG. 7 is a partial bottom view diagram of a touch-sensing element according to another exemplary embodiment of the disclosure.

Referring to FIG. 7, a touch-sensing element 120A is disposed on the cover plate 110. The touch-sensing element 120A includes a plurality of first sensing series S1 and a plurality of second sensing series S2, wherein the first extension direction D1 of each of the first sensing series S1 intersects with the second extension direction D2 of each of the second sensing series S2, and the first sensing series S1 are electrically independent from the second sensing series S2. The first sensing series S1 and the second sensing series S2 are connected to the circuit board F through the transmission lines X.

Each of the first sensing series S1 includes a plurality of first sensing pads E1 and a plurality of first bridge lines B1 serially connecting the plurality of first sensing pads E1 along the first extension direction D1, and each of the second sensing series S2 includes a plurality of second sensing pads E2 and a plurality of bridge lines B2 serially connecting the plurality of second sensing pads E2 along the second extension direction D2.

Figure 8:
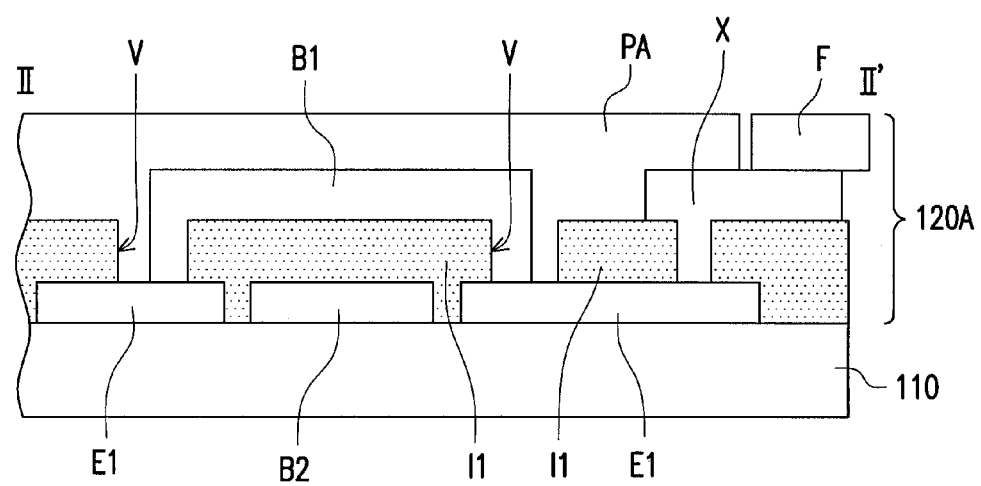
FIG. 8 is a first partial cross-sectional view diagram of the touch-sensing element in FIG. 7 along the cutting line II-II'.
Figure 9:
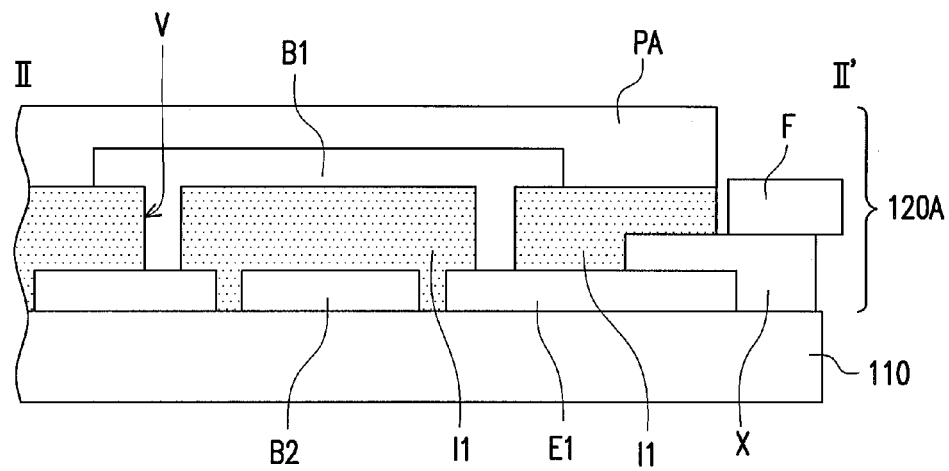
FIG. 9 is a second partial cross-sectional view diagram of the touch-sensing element in FIG. 7 along the cutting line II-II'.

Referring concurrently to FIGS. 7, 8 and 9, in the touch-sensing element 120A, the second sensing pads E2 of the second sensing series S2, the second bridge lines B2, and the first sensing pads E1 of the first sensing series S1 are fabricated from a same film. The first sensing pads E1 and the second sensing series S2 are constructed with a transparent conductive material, for example. However, it is to be understood that the material of the first sensing pads E1 and the second sensing series S2 in these exemplary embodiments are presented by way of example and not by way of limitation.

Moreover, the touch-sensing element 120A further includes an insulation structure I1 covering the first sensing pads E1 and the second sensing series S2 formed from the same film layer, and the insulation structure I1 has a plurality of contact vias V that exposes the first sensing pads E1. The first bridge lines B1 are disposed on the insulation structure I1 and are electrically connected with the first sensing pads E1 through the contact vias V. The material of the first bridge lines B1 includes, for example, metal (as shown in FIG. 8) or a transparent material (as shown in FIG. 9). The touch-sensing element 120A is also covered with a passivation layer PA.

Figure 10:
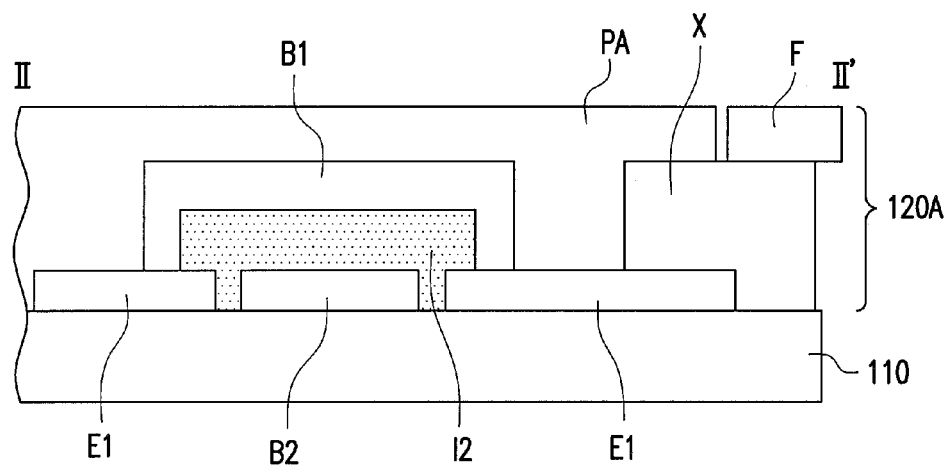
FIG. 10 is a third partial cross-sectional view diagram of the touch-sensing element in FIG. 7 along the cutting line II-II'.

Referring to both FIGS. 7 and 10, the current exemplary embodiment illustrated in FIG. 10 and the design illustrated in FIG. 8 are similar. The difference between the two designs is that the insulation structure I2 in the current exemplary embodiment has an island shape pattern, in which the insulation structure I2 is configured between the first bridge line B1 and the second bridge line B2.

Figure 11:
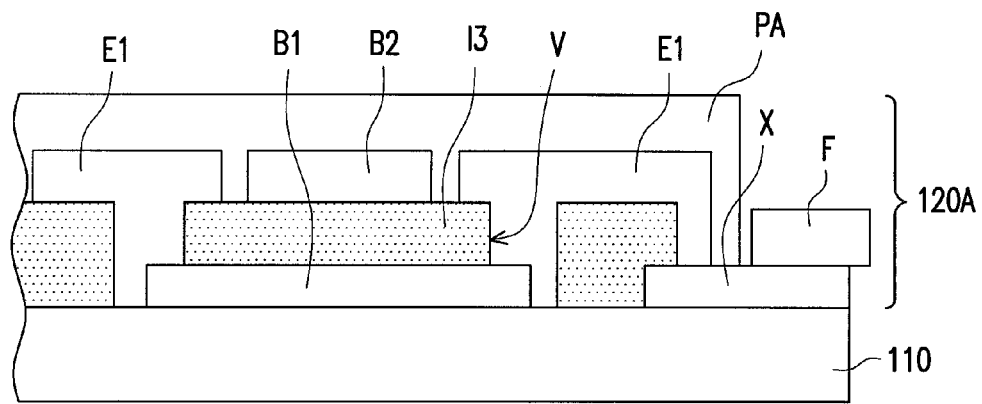
FIG. 11 is a fourth partial cross-sectional view diagram of the touch-sensing element in FIG. 7 along the cutting line II-II'.

Referring to both FIGS. 7 and 11, due to the different manufacturing sequences of the devices, the cross-sectional structure of the touch-sensing element 120a also changes. In the present exemplary embodiment, during the manufacturing of the touch-sensing element, a metal material or a transparent conductive material is used to form the first bridge lines B1 on the cover plate 110. An insulation structure I3 is then formed on the first bridge lines B1. The insulations structure I3 includes, for example, a plurality of contact vias V, and the insulation structure I3 has, for example, a layer shape structure (alternatively speaking, the insulation structure I3 is an insulation layer). The contact vias V may expose the two ends of each of the first bridge lines B1. The second sensing series S2 and the first sensing pads E1, constructed from a transparent conductive layer, are formed on the insulation structure I3, wherein the first sensing pads E1 are electrically connected with the corresponding first bridge lines B1 through the contact vias V. Thereafter, a passivation layer PV is formed to cover the touch-sensing element 120A.

Figure 12:
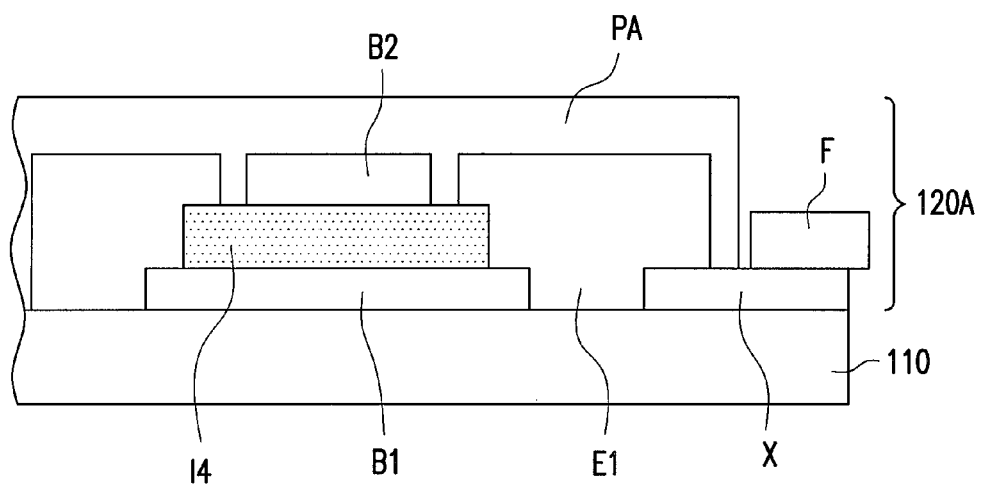
FIG. 12 is a fifth partial cross-sectional view diagram of the touch-sensing element in FIG. 7 along the cutting line II-II'.

Referring to both FIGS. 7 and 12, the cross-sectional structure of the touch sensing element 120A in the present exemplary embodiment is similar the cross-section structure of the touch sensing element illustrated in FIG. 11, wherein the major difference between the two structures is that the insulation structure I4 has an island shape pattern, rather than a layer shape.

Figure 13:
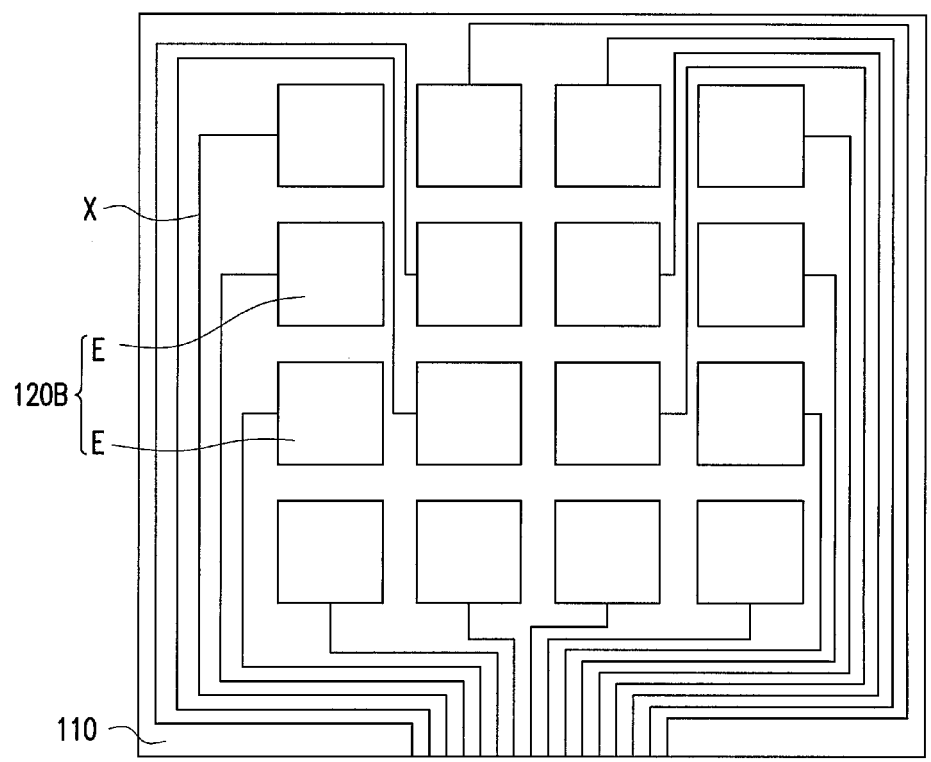
FIG. 13 is a partial bottom view diagram of another touch-sensing element according to an exemplary embodiment of the disclosure.

Referring to FIG. 13, the touch-sensing element 120B disposed on the cover plate 110 may be constructed with a plurality of sensing pads E, and each of the sensing pads E is connected with a transmission line X for connecting to the circuit board (not shown) or the control chip (not shown).

Figure 14:
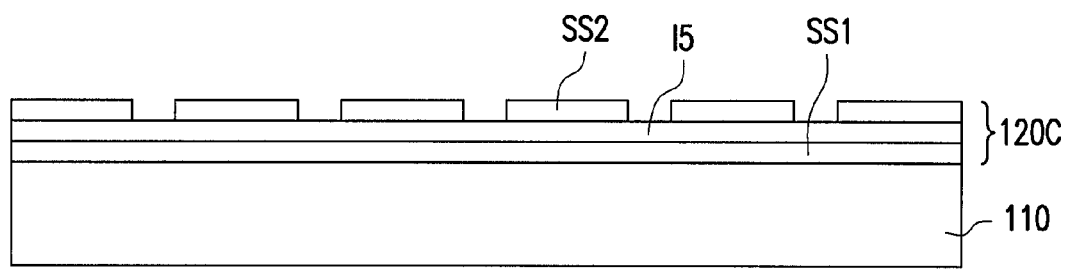
FIG. 14 is a partial cross-sectional view diagram of another touch-sensing element according to an exemplary embodiment of the disclosure.

Referring to FIG. 14, the touch-sensing element 120C disposed on the cover plate 110 may include a first sensing layer SS1, a second sensing layer SS2, and an insulation layer I5. The first sensing layer SS1 is disposed on a cover plate 110 and the insulation layer I5 is disposed on the first sensing layer SS1, while the second sensing layer SS2 is disposed on the insulation layer I5. Alternatively speaking, two different sensing layers SS1 and SS2 of different planes form the touch-sensing element 120C.

Figure 15:
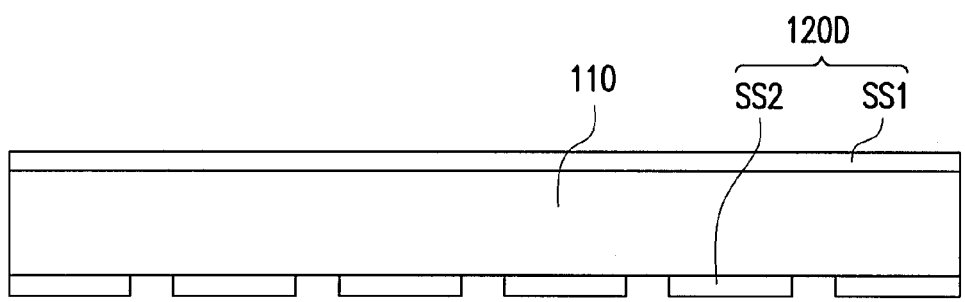
FIG. 15 is a partial cross-sectional view diagram of another touch-sensing element according to an exemplary embodiment of the disclosure.

Referring to FIG. 15, the touch-sensing element 120C disposed on the cover plate 110 may include a first sensing layer SS1 and a second sensing layer SS2, and the first sensing layer SS1 and the second sensing layer SS2 are respectively disposed on two sides of the cover plate 110.

Figure 16:
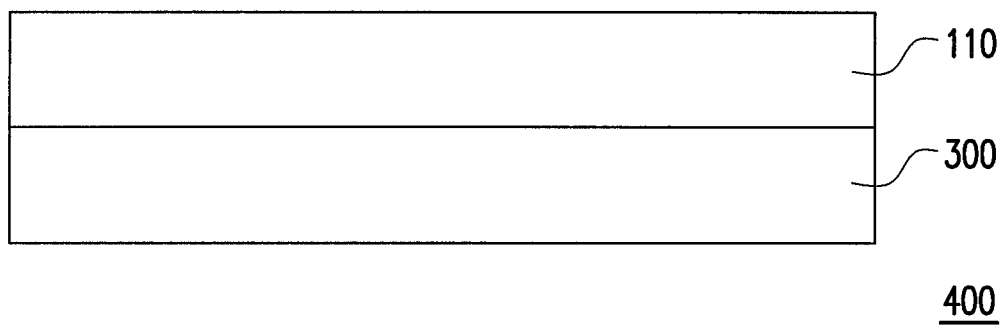
FIG. 16 is a schematic diagram of a touch-sensing display apparatus according to an exemplary embodiment of the disclosure.

Further, as shown in FIG. 16, the cover plate 110 with the touch-sensing element 120B may combine with a display panel 300 to form a touch-sensing display device 400, wherein the cover plate 110 is adhered to the display panel 300. The display panel 300 may be selected from, for example, an organic light emitting diode display, a liquid crystal display, an electrowetting display, or a bi-stable display. The cover plate 110 of the touch-sensing display device 300 is similar to the structure previously described, and the details thereof is omitted herein.

According to the exemplary embodiments of the disclosure, the touch sensing element is disposed on the cover plate to achieve the thinning design of a touch panel. Moreover, the exterior surface of the touch panel is formed with an atomic layer-deposited thin film; accordingly, the mechanical strength of the touch panel is enhanced and the damage being induced to the touch panel when it is subjected to an external impact is mitigated. More specifically, during the fabrication of the touch panel of the invention, edge etching may be performed on the cover plate to reduce the depth of the crack on the edge of the cover plate. Consequently, the mechanical strength of the touch sensing panel is increased. Further, in one exemplary embodiment of the disclosure, a packing film may form on the side surface of the cover plate to smoothen the crack on the side surface, in which the mechanical property of the touch panel is reinforced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a cover plate comprising a top surface, a bottom surface, and a side surface, wherein the top surface is configured opposite to the bottom surface, and the side surface connects the top surface with the bottom surface;
   a touch-sensing element, disposed on the bottom surface of the cover plate; and
   an atomic layer-deposited thin film, completely covering the touch-sensing element and completely covering the top surface, the side surface and a portion of the bottom surface of the cover plate, wherein the touch-sensing element is not disposed on the portion of the bottom surface.

2. The touch panel of claim 1, wherein the atomic layer-deposited thin film is constituted with a material comprising an inorganic material, an organic material, a polycrystalline material, or an amorphous material.

3. The touch panel of claim 2, wherein the inorganic material comprises aluminum oxide, silicon oxide, titanium oxide, or zinc oxide, while the organic material comprises polyimide.

4. The touch panel of claim 1 further comprising a packing film, disposed on the side surface of the cover plate, and a part of the atomic layer-deposited thin film is packed between the packing film and the side surface.

5. The touch panel of claim 4, wherein the packing film is constituted with a material comprising inorganic silicon dioxide.

6. The touch panel of claim 1, wherein the touch-sensing element comprises a plurality of first sensing series and a plurality of second sensing series, an extension direction of each of the plurality of first sensing series intersects with an extension direction of each of the plurality of second sensing series, and the plurality of first sensing series is electrically independent from the plurality of second sensing series.

7. The touch panel of claim 1 further comprising a decorative layer, disposed on the cover plate.

8. The touch panel of claim 7, wherein the decorative layer encircles a periphery of the cover plate.

9. The touch panel of claim 8, wherein the decorative layer is constituted with a material comprising carbon-like diamond, ceramic, ink, or a photoresist material.

10. A method for fabricating a touch panel, the method comprising:
    providing a cover plate, and the cover plate comprising a top surface, a bottom surface, and a side surface, wherein the top surface is configured opposite to the bottom surface, the side surface connects with the top surface and the bottom surface, and the bottom surface of the cover plate is disposed with a touch-sensing element; and
    performing an atomic layer deposition process to form an atomic layer-deposited thin film to cover the touch-sensing element and the top surface, the side surface, and a portion of the bottom surface of the cover plate, wherein the touch-sensing element is not disposed on the portion of the bottom surface.

11. The method of claim 10, wherein prior to the step of performing the atomic layer deposition process, an edge etching process is performed on the side surface of the cover plate.

12. The method of claim 10, wherein subsequent to the step of performing the atomic layer deposition process, a packing film is formed on the side surface of the cover plate.

13. A touch-sensing display device, comprising:
    a display panel; and
    a cover plate, adhered to the display panel, the cover plate comprising:
       a top surface, a bottom surface, and a side surface, wherein the top surface is configured opposite to the bottom surface, and the side surface connects the top surface with the bottom surface;
       a touch-sensing element, disposed on the bottom surface of the cover plate; and
       an atomic layer-deposited thin film, completely covering the touch-sensing element and completely covering the top surface, the side surface, and a portion of the bottom surface of the cover plate wherein the touch-sensing element is not disposed on the portion of the bottom surface.

* * * * *